(12) United States Patent
Hokari et al.

(10) Patent No.: US 8,920,548 B2
(45) Date of Patent: Dec. 30, 2014

(54) $CO_2$ CAPTURE SYSTEM BY CHEMICAL ABSORPTION

(71) Applicant: Babcock-Hitachi K.K., Chiyoda-ku, Tokyo (JP)

(72) Inventors: Nobuyuki Hokari, Hitachinaka (JP); Hisayuki Orita, Hitachinaka (JP); Masaaki Mukaide, Hitchinaka (JP); Jun Shimamura, Kure (JP); Kouichi Yokoyama, Kure (JP); Noriko Yoshida, Mito (JP)

(73) Assignee: Babcock-Hitachi K.K., Tokyo (JP)

( * ) Notice: Subject to any disclaimer, the term of this patent is extended or adjusted under 35 U.S.C. 154(b) by 70 days.

(21) Appl. No.: 13/730,600

(22) Filed: Dec. 28, 2012

(65) Prior Publication Data

US 2013/0177481 A1 Jul. 11, 2013

(30) Foreign Application Priority Data

Jan. 6, 2012 (JP) .................. 2012-000960

(51) Int. Cl.
*B01D 53/14* (2006.01)
*B01D 47/00* (2006.01)
*B01D 19/00* (2006.01)
*B01D 53/62* (2006.01)

(52) U.S. Cl.
CPC ............ *B01D 53/62* (2013.01); *B01D 53/1425* (2013.01); *Y02C 10/04* (2013.01); *B01D 2258/0283* (2013.01); *Y02C 10/06* (2013.01); *B10D 53/1475* (2013.01)
USPC .................... 96/244; 96/243; 96/262; 96/266; 95/149; 95/156; 95/172; 95/187; 95/173; 95/186

(58) Field of Classification Search
None
See application file for complete search history.

(56) References Cited

U.S. PATENT DOCUMENTS

| 4,160,810 A | 7/1979 | Benson et al. |
|---|---|---|
| 8,052,948 B2 | 11/2011 | Iijima |

(Continued)

FOREIGN PATENT DOCUMENTS

| JP | 2008-62165 A | 3/2008 |
|---|---|---|
| JP | 2010-22986 A | 2/2010 |

(Continued)

OTHER PUBLICATIONS

Canadian Office Action dated Mar. 10, 2014 (2 pages).
Canadian Office Action dated Sep. 15, 2014.

*Primary Examiner* — Frank Lawrence
*Assistant Examiner* — Pankti Patel
(74) *Attorney, Agent, or Firm* — Crowell & Moring LLP

(57) ABSTRACT

The $CO_2$ capture system by chemical absorption for removing $CO_2$ from a combustion exhaust gas by a solvent, comprising: an absorber for absorbing $CO_2$ by a solvent, a regenerator for heating a rich solvent absorbed $CO_2$ thereby releasing $CO_2$, a gas exhaust system for discharging gas from the regenerator, a gas compressor installed in the gas exhaust system, a heat exchanger disposed downstream of the gas compressor for exchanging heat between compressed gas and rich solvent to be supplied to the regenerator, a gas-liquid separator disposed downstream of the heat exchanger for separating gas from condensed water, a condensed water supply system for supplying condensed water from the gas-liquid separator to the regenerator, another gas exhaust system for discharging gas containing high-concentration $CO_2$ from the gas-liquid separator, and a compressor disposed downstream of the gas-liquid separator in the another gas exhaust system for pressurizing the gas containing high-concentration $CO_2$.

2 Claims, 5 Drawing Sheets

(56) References Cited

U.S. PATENT DOCUMENTS

| | | | | |
|---|---|---|---|---|
| 8,557,205 | B2* | 10/2013 | Richter et al. | 423/220 |
| 2009/0241778 | A1* | 10/2009 | Lechnick et al. | 95/177 |
| 2011/0107916 | A1 | 5/2011 | Inoue et al. | |
| 2012/0125196 | A1* | 5/2012 | Woodhouse et al. | 95/193 |
| 2013/0153400 | A1* | 6/2013 | Hume et al. | 203/26 |
| 2013/0206010 | A1* | 8/2013 | Iijima et al. | 96/242 |

FOREIGN PATENT DOCUMENTS

| | | |
|---|---|---|
| JP | 2011-213494 A | 10/2011 |
| JP | 2012-538 A | 1/2012 |
| JP | 2012-167918 A | 9/2012 |
| JP | 2013-694 A | 1/2013 |
| WO | WO 2009/091437 A1 | 7/2009 |
| WO | WO 2012/111495 A1 | 8/2012 |

\* cited by examiner

CO₂ CAPTURE SYSTEM BY CHEMICAL ABSORPTION

CLAIM OF PRIORITY

The present application claims priority from Japanese patent application JP 2012-000960 filed on Jan. 6, 2012, the content of which is hereby incorporated by reference into this application.

BACKGROUND OF THE INVENTION

1. Technical Field

The present inventions relates to a $CO_2$ capture system by chemical absorption that recovers $CO_2$ from combustion exhaust gas, and in particular, to a $CO_2$ capture system by chemical absorption that reduces energy loss of the $CO_2$ capture system.

2. Background Art

To reduce emission of carbon dioxide ($CO_2$) which causes global warming, technologies for removing $CO_2$ from exhaust gas discharged from plants where fossil fuels are burnt have been being developed. One of those technologies is a $CO_2$ capture system by chemical absorption which recovers $CO_2$ from gas by means of an alkaline solvent.

Basic mechanism of the $CO_2$ capture system by chemical absorption is described in, for example, Japanese Patent Laid-Open No. 2010-22986 (patent literature 1). $CO_2$-containing exhaust gas is supplied to an absorber and comes in contact with a solvent therein, and the $CO_2$ contained in the exhaust gas is absorbed by the solvent.

The solvent (rich solvent) that has absorbed $CO_2$ is supplied to a regenerator and regenerated by releasing $CO_2$. The regenerated solvent (lean solvent) is then supplied to an absorber and used again for absorbing $CO_2$. The $CO_2$ that has been released in the regenerator is compressed and supplied to underground storage equipment or the like.

Since the $CO_2$ release reaction that regenerates the solvent is an endothermic reaction, it is necessary to heat up the rich solvent to be supplied to the regenerator and the inside of the regenerator to a temperature between 100° C. and 120° C.

The rich solvent is heated through the heat exchanger by the lean solvent supplied from the regenerator. Furthermore, the solvent is heated using heating vapor in a reboiler attached to the regenerator, and generated vapor is supplied to the regenerator, thereby heating the inside of the regenerator.

One of the problems for practical use of the $CO_2$ capture system by chemical absorption is to reduce energy (recovery energy) necessary for regenerating the solvent. If recovery energy can be reduced, it is possible to effectively use more energy taken out from a combustion plant.

Techniques for that purpose include a vapor recompression (hereafter abbreviated as VR) technique described in WO 2009/091437 (patent literature 2) and a multi-effect technique. Furthermore, Japanese Patent Laid-Open No. 2008-62165 (patent literature 3) describes a method for heating a lean solvent by means of the heat generated when $CO_2$ emitted from the regenerator is compressed by a compressor.

PATENT LITERATURE 1

Japanese Patent Laid-Open No. 2010-22986

PATENT LITERATURE 2

WO 2009/091437

PATENT LITERATURE 3

Japanese Patent Laid-Open No. 2008-62165

SUMMARY OF THE INVENTION

To increase energy efficiency of the $CO_2$ capture system by chemical absorption including the reduction of recovery energy, it is necessary to reduce input energy as well as reducing and reusing waste heat. However, with regard to the $CO_2$ capture system by chemical absorption described in each of the cited patent literatures, nothing is proposed about specific techniques to reduce energy and reduce and reuse waste heat.

An object of the present invention is to provide a $CO_2$ capture system by chemical absorption capable of increasing energy efficiency of the system by reducing recovery energy inputted into the regenerator as well as reducing cooling exhaust heat resulting from exhaust gas cooling.

An aspect in accordance with the present invention provides a $CO_2$ capture system by chemical absorption for removing $CO_2$ from a combustion exhaust gas by a solvent, comprising: an absorber for absorbing $CO_2$ by the solvent; a regenerator for heating a rich solvent that has absorbed $CO_2$ thereby releasing $CO_2$ and forming a lean solvent; a rich solvent supply system for supplying the rich solvent from the absorber to the regenerator; a lean solvent supply system for supplying the lean solvent from the regenerator to the absorber; a heat exchanger for exchanging heat between the rich solvent and the lean solvent supplied from the respective supply systems; and a reboiler for heating the solvent supplied from the regenerator; the $CO_2$ capture system by chemical absorption further comprising: a gas exhaust system for discharging gas released from the solvent in the regenerator; a gas compressor installed downstream of the gas exhaust system; a heat exchanger disposed downstream of the gas compressor for exchanging heat between a compressed gas and a rich solvent to be supplied to the regenerator; a gas-liquid separator disposed downstream of the heat exchanger for separating gas from condensed water; a condensed water supply system for supplying condensed water from the gas-liquid separator to the regenerator; another gas exhaust system for discharging gas containing high-concentration $CO_2$ from the gas-liquid separator; and a compressor, disposed downstream of the gas-liquid separator in the another gas exhaust system, for pressurizing the gas containing high-concentration $CO_2$.

Another aspect of the present invention provides a $CO_2$ capture system by chemical absorption for removing $CO_2$ from a combustion exhaust gas by a solvent, comprising: an absorber for absorbing $CO_2$ by the solvent; a regenerator for heating a rich solvent that has absorbed $CO_2$ thereby releasing $CO_2$ and forming a lean solvent; a rich solvent supply system for supplying the rich solvent from the absorber to the regenerator; a lean solvent supply system for supplying the lean solvent from the regenerator to the absorber; a heat exchanger for exchanging heat between the rich solvent and the lean solvent supplied from the respective supply systems; and a reboiler for heating the solvent supplied from the regenerator; the $CO_2$ capture system by chemical absorption further comprising: a gas exhaust system for discharging gas released from the solvent in the regenerator; a gas compressor installed downstream of the gas exhaust system; a heat exchanger disposed downstream of the gas compressor for exchanging heat between a compressed gas and a rich solvent to be supplied to the regenerator; a gas-liquid separator disposed downstream of the heat exchanger for separating gas from condensed water; a condensed water supply system for supplying condensed water from the gas-liquid separator to the regenerator; another gas exhaust system for discharging gas containing high-concentration $CO_2$ from the gas-liquid separator; and a compressor, disposed downstream of the gas-liquid separator in the another gas exhaust system, for pressurizing the gas containing high-concentration $CO_2$, and a vapor recompression system for supplying vapor to the regenerator comprising: a decompression evaporator for evaporating the lean solvent discharged from the regenerator or the reboiler; a compressor for pressurizing vapor generated by the decompression evaporator; and a vapor system for supplying the vapor generated by the decompression evaporator to the compressor and supplying the vapor pressurized and heated by the compressor to the regenerator.

Still another aspect of the present invention provides a $CO_2$ capture system by chemical absorption for removing $CO_2$ from a combustion exhaust gas by a solvent, comprising: an absorber for absorbing $CO_2$ by the solvent; a regenerator for heating a rich solvent that has absorbed $CO_2$ thereby releasing $CO_2$ and forming a lean solvent; a rich solvent supply system for supplying the rich solvent from the absorber to the regenerator; a lean solvent supply system for supplying the lean solvent from the regenerator to the absorber; a heat exchanger for exchanging heat between the rich solvent and the lean solvent supplied from the respective supply systems; and a reboiler for heating the solvent supplied from the regenerator; the $CO_2$ capture system by chemical absorption further comprising: a gas exhaust system for discharging gas released from the solvent in the regenerator; a gas compressor installed downstream of the gas exhaust system; a heat exchanger disposed downstream of the gas compressor for exchanging heat between a compressed gas and a rich solvent to be supplied to the regenerator; a gas-liquid separator disposed downstream of the heat exchanger for separating gas from condensed water; a condensed water supply system for supplying condensed water from the gas-liquid separator to the regenerator; another gas exhaust system for discharging gas containing high-concentration $CO_2$ from the gas-liquid separator; a compressor, disposed downstream of the gas-liquid separator in the another gas exhaust system, for pressurizing the gas containing high-concentration $CO_2$, a solvent supply system for supplying the solvent from the regenerator to the reboiler; a decompression valve installed in the solvent supply system; the reboiler having lower inner pressure than the pressure of the regenerator; a compressor for pressurizing vapor generated by the reboiler; and a pump and lean solvent supply system for supplying the lean solvent discharged from the reboiler to the absorber.

According to the present invention, it is possible to provide a $CO_2$ capture system by chemical absorption capable of increasing energy efficiency of the system by reducing recovery energy inputted into the regenerator as well as reducing cooling exhaust heat resulting from exhaust gas cooling.

DETAILED DESCRIPTION OF THE EMBODIMENTS

Next, embodiments of the $CO_2$ capture system by chemical absorption according to the present invention will be described with reference to the drawings.

Embodiment 1

Figure 1:
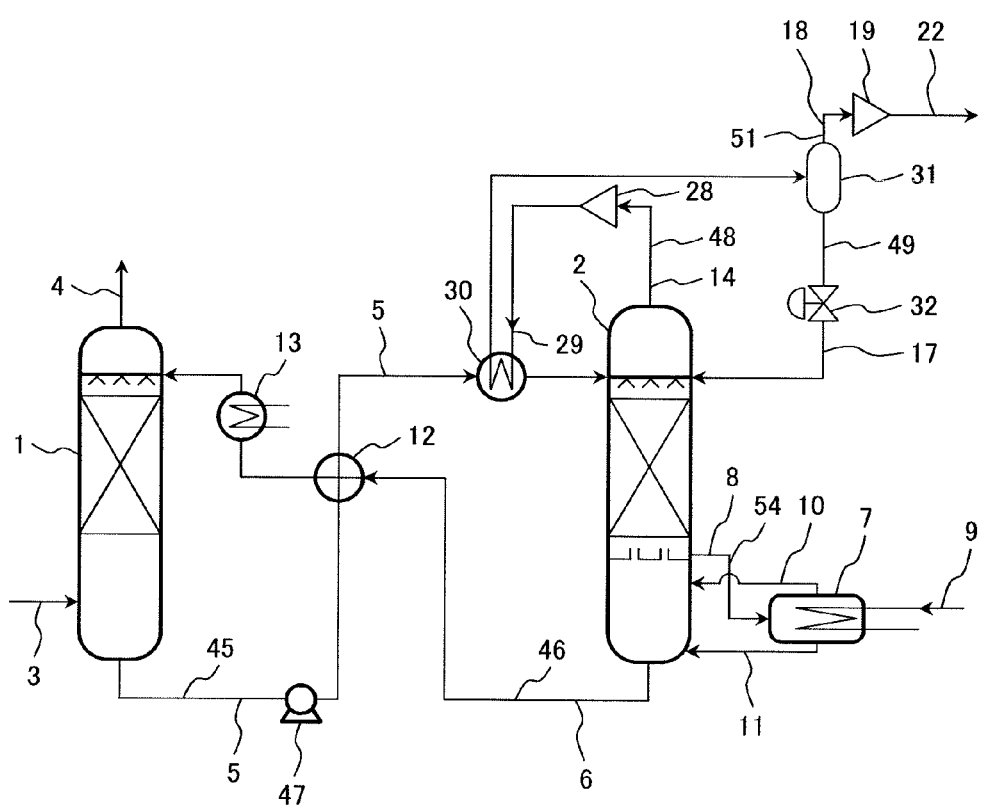
FIG. 1 is a schematic diagram showing the $CO_2$ capture system by chemical absorption according to a first embodiment of the present invention.

A first embodiment of the $CO_2$ capture system by chemical absorption according to the present invention will be described with reference to FIG. 1. In FIG. 1, an example will be described in which the outlet gas heat of the regenerator of the $CO_2$ capture system by chemical absorption is recovered and reused for an inlet rich solvent of the regenerator.

FIG. 1 shows the system configuration of the regenerator and peripheral devices of the $CO_2$ capture system by chemical absorption according to the first embodiment of the present invention.

The $CO_2$ capture system by chemical absorption according to this embodiment comprises an absorber 1 for removing $CO_2$ contained in exhaust gas by absorbing $CO_2$ by a solvent, and a regenerator 2 for separating $CO_2$ from the solvent that has absorbed $CO_2$ and regenerating the solvent, wherein the solvent is circulated between the absorber 1 and the regenerator 2.

To explain the $CO_2$ capture system by chemical absorption according to this embodiment in detail, exhaust gas 3 that contains $CO_2$ is supplied to an absorber 1 and comes in counter-contact with a solvent in the absorber 1, and $CO_2$ contained in the exhaust gas 3 is absorbed by the solvent.

Then, the exhaust gas 3 from which $CO_2$ has been removed by the absorption by the solvent in the absorber 1 is discharged to the outside of the system as a $CO_2$-free gas 4. Temperature of the absorber 1 is kept within the range of 40° C. to 50° C. which is suitable for the absorption of $CO_2$ by a solvent.

The rich solvent 5, which is a solvent that has absorbed $CO_2$ contained in the exhaust gas 3 in the absorber 1, is supplied to the regenerator 2, and is regenerated as a lean solvent by releasing $CO_2$ contained therein in the regenerator 2. Temperature of the regenerator 2 is kept within the range of 100° C. to 120° C. which is suitable for releasing $CO_2$. Also, the regenerator 2 is kept pressurized at a pressure between 0.15 and 0.2 MPa to prevent the solvent from evaporating due to high temperature.

To heat up the solvent in the regenerator 2, a reboiler 7 is attached to the regenerator 2. The solvent 8 supplied from the regenerator 2 to the reboiler 7 is heated by regenerated vapor 9 supplied to the reboiler 7, and the generated heating vapor 10 and the heated lean solvent 11 are returned to the bottom of the regenerator 2 from the reboiler 7.

Herein, since temperature of the lean solvent 11 is a saturation temperature to generate heating vapor, the temperature is 10° C. to 15° C. higher than the temperature of the regenerator. The lean solvent 6 is supplied to the absorber 1 from the regenerator 2 through the lean solvent supply system 46. The lean solvent 6 then exchanges heat with the rich solvent 5 flowing through the rich solvent supply system 45 in the liquid heat exchanger 12 installed along the path of the lean solvent supply system 46, and increases the temperature of the rich solvent 5 to 100° C. to 120° C.

Temperature of the rich solvent 5 at the outlet of the liquid heat exchanger 12 is still 50° C. to 60° C. Accordingly, the rich solvent 5 is cooled to 40° C. to 50° C., which is suitable for absorbing $CO_2$, by the liquid cooler 13 installed along the path of the rich solvent supply system 45.

On the other hand, $CO_2$ is released from the rich solvent 5 in the regenerator 2, and exhaust gas 14 made up of $CO_2$ and vapor is extracted from the top of the regenerator 2 by the gas exhaust system 48. The exhaust gas 14 is then cooled through the heat exchanger 30 installed along the path of the gas exhaust system 48 due to heat exchange, and subsequently separated into $CO_2$ rich gas 18 and condensed water 17 by the gas-liquid separator 31 installed downstream of the heat exchanger 30.

The $CO_2$ rich gas 18 that has been separated by the gas-liquid separator 31 is then compressed by a compressor 19 installed in the gas exhaust system 51 of the gas-liquid separator 31.

Furthermore, condensed water 17 that has been separated by the gas-liquid separator 31 is returned to the regenerator 2 through the condensed water supply system 49.

The condensed water supply system 49 extending from the gas-liquid separator 31 prevents the solvent from reaching a high concentration due to evaporation of water and also reduces motive power by reducing the amount of gas flowing through the compressor 19.

In the $CO_2$ capture system by chemical absorption according to this embodiment, exhaust gas 14 that contains $CO_2$ and vapor discharged from the top of the regenerator 2 through the gas exhaust system 48 is pressurized and heated by a compressor 28 installed in the gas exhaust system 48.

The pressurized gas 29 which has been pressurized and heated by the compressor 28 heats up the rich solvent 5 which has been supplied from the absorber 1 through the rich solvent supply system 45 through the heat exchanger 30 installed in the gas exhaust system 48.

In the exhaust gas 14 from which heat has been removed due to heat exchange in the heat exchanger 30, vapor condenses into water. This water is separated into condensed water 17 and $CO_2$ rich gas 18 by the gas-liquid separator 31 installed in the gas exhaust system 48 located downstream of the heat exchanger 30.

Condensed water 17 that has been separated by the gas-liquid separator 31 is recovered to the regenerator 2 through the condensed water supply system 49 via the control valve 32 for decompression and flow control disposed in the condensed water supply system 49.

The volume of gas is reduced by condensation of vapor and recovery of condensed water by the gas-liquid separator 31, and the condensed water 17 can be reused in the regenerator 2. The $CO_2$ rich gas 18 separated by the gas-liquid separator 31 is further compressed by the compressor 19 installed in another gas exhaust system 51 disposed outside the gas-liquid separator 31, and the compressed $CO_2$ gas 22 compressed by the compressor 19 is then transported through the gas exhaust system 51 or supplied to the storage equipment (not shown).

The gas exhaust system for treating exhaust gas can be designed by determining outlet pressure of the compressor 28 installed in the gas exhaust system 48 so that the temperature of the rich solvent 5 supplied to the regenerator 2 from the absorber 1 through the rich solvent supply system 45 will become the temperature of the pressurized gas 29 necessary for heating to the preset temperature.

Furthermore, the compressor 28 may be controlled so that temperature of the rich solvent 5 supplied to the heat exchanger 30 or temperature of the pressurized gas 29 will become a preset value.

To increase the volume of water which is recovered by the gas-liquid separator 31 and returned to the regenerator 2, a cooler for further cooling the outlet gas of the heat exchanger 30 may be installed downstream of the heat exchanger 30.

In the condensed water supply system 49 for supplying condensed water 17 separated by the gas-liquid separator 31 to the regenerator 2, a pump may be installed instead of the control valve 32 so as to control the flow rate.

The compressor 19 installed in the gas exhaust system 51 to compress $CO_2$ rich gas 18 discharged from the gas-liquid separator 31 is designed according to the pressure upstream of the compressor and the pressure at the outlet of the compressor. The upstream pressure of the compressor 19 is determined by the outlet pressure of the compressor 28 installed in the gas exhaust system 48 disposed upstream of the gas-liquid separator 31. Therefore, motive power of the compressor 19 may be controlled according to the value of the pressure of the pressurized gas 29.

As stated above, according to this embodiment, it is possible to achieve a $CO_2$ capture system by chemical absorption capable of increasing energy efficiency of the system by reducing recovery energy inputted into the regenerator as well as reducing exhaust heat resulting from exhaust gas cooling.

Embodiment 2

Next, a second embodiment of the $CO_2$ capture system by chemical absorption according to the present invention will be described with reference to FIG. 2.

Figure 2:
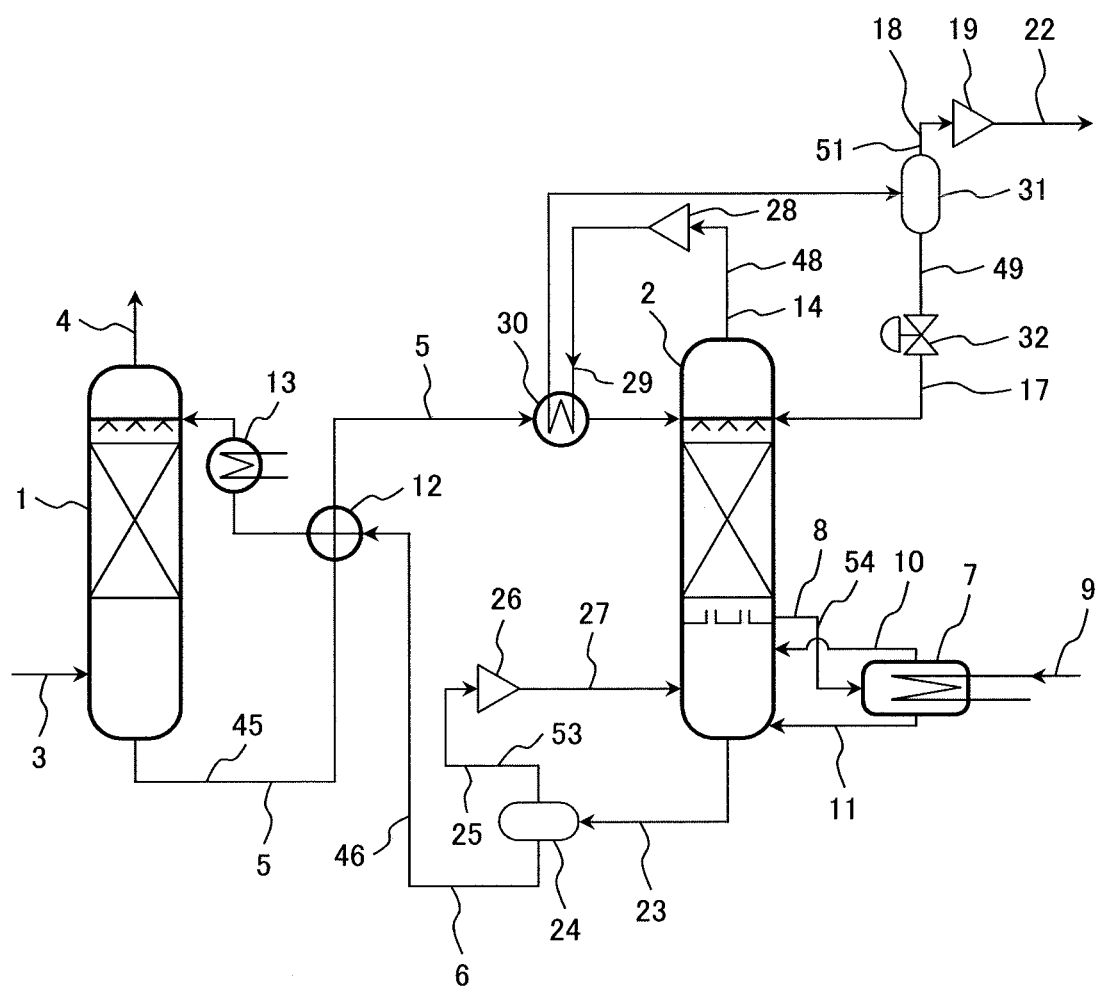
FIG. 2 is a schematic diagram showing the $CO_2$ capture system by chemical absorption according to a second embodiment of the present invention.

Basic configuration of the $CO_2$ capture system by chemical absorption according to this embodiment shown in FIG. 2 is the same as that of the $CO_2$ capture system by chemical absorption according to the first embodiment shown in FIG. 1. Therefore, description of the configuration common to both systems is omitted and only different parts will be described below.

FIG. 2 shows an example of the $CO_2$ capture system by chemical absorption that combines the configuration of the $CO_2$ capture system by chemical absorption according to the first embodiment with the VR technique.

In the $CO_2$ capture system by chemical absorption shown in FIG. 2, the rich solvent 5 that has absorbed $CO_2$ contained in the exhaust gas in the absorber 1 is heated, through the liquid heat exchanger 12 installed along the path of the rich solvent supply system 45, by a lean solvent 6 supplied from a regenerator 2 through a lean solvent supply system 46 and supplied to the regenerator 2 through the rich solvent supply system 45 located downstream of the liquid heat exchanger 12.

The gas exhaust system 48 extending from the regenerator 2, where $CO_2$ is released from a rich solvent 5, and the solvent supply system 54 around the reboiler 7 for heating the regenerator 2 are the same as those of the $CO_2$ capture system by chemical absorption according to the first embodiment shown in FIG. 1.

Since the VR technique is applied to the $CO_2$ capture system by chemical absorption according to this embodiment, a vapor recompression system 53 which is branched from the lean solvent supply system 46 and connected to the regenerator 2, is disposed. The vapor recompression system 53 is made up of a decompression evaporator 24 installed along the path of the vapor system for evaporating the lean solvent discharged from the regenerator 2 or the reboiler 7, a compressor 26 installed along the path of the vapor system for pressurizing and heating the vapor 25 generated by the decompression evaporator 24, and a vapor system for supplying the vapor 25 evaporated by the decompression evaporator 24 to the compressor 26 and supplying the vapor 27 pressurized and heated by the compressor 26 to the regenerator 2. That is, the vapor recompression system 53 is made up of the decompression evaporator 24 for generating the vapor 25, the compressor 26 for pressurizing and heating the vapor 25 to become the vapor 27, and the vapor system for supplying the vapor 25 to the compressor 26 and supplying the vapor 27 to the regenerator 2.

In the $CO_2$ capture system by chemical absorption according to this embodiment, even if temperature of the rich solvent 5 at the outlet of the heat exchanger is lower than the temperature of the inside of the regenerator 2, by further heating the rich solvent 5 by pressurized gas 29 through the heat exchanger 30 installed in the rich solvent supply system 45, it is possible to increase the temperature of the rich solvent 5 at a required temperature.

Therefore, it is possible to lower the temperature of the lean solvent 6, thereby reducing the pressure of the decompression evaporator 24. For example, if the pressure of the decompression evaporator 24 can be lowered to one atmosphere, the volume of the generated vapor 25 can become maximum.

If vapor 25 generated by the decompression evaporator 24 is pressurized and heated by the compressor 26 installed in the vapor recompression system 53 and supplied to the regenerator 2, the maximum possible amount of heat is to be obtained by the VR technique. Therefore, it is possible to minimize the amount of regenerated vapor 9 used for heating in the reboiler 7.

At the same time, because temperature at the outlet of the lean solvent system of the liquid heat exchanger 12 decreases, it is possible to reduce the amount of waste heat in the liquid cooler 13 installed in the lean solvent supply system 46.

Figure 3:
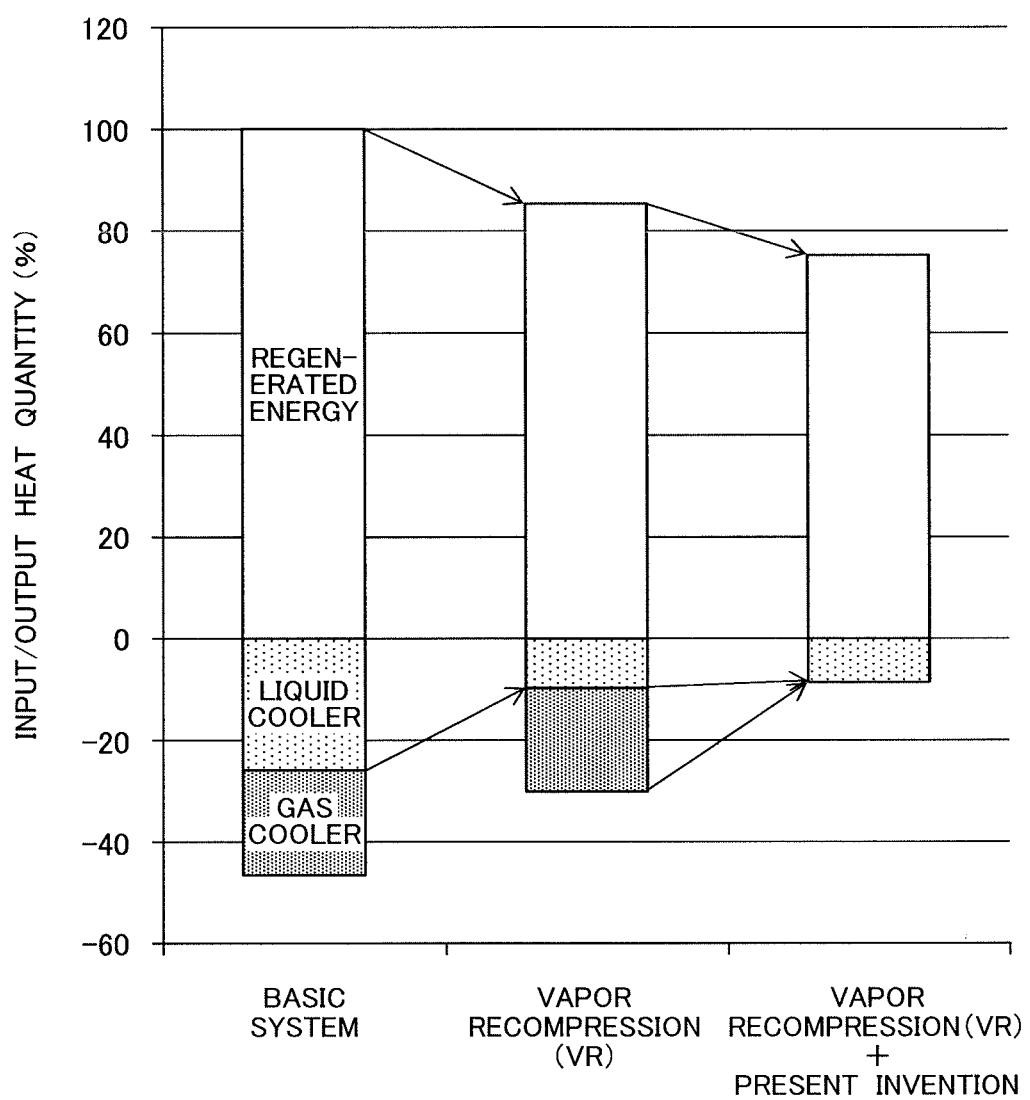
FIG. 3 is a characteristic diagram showing the reduction effects of the recovery energy and exhaust heat in the $CO_2$ capture system by chemical absorption according to an embodiment of the present invention.

FIG. 3 shows the reduction effects of recovery energy and cooling waste heat in the $CO_2$ capture system by chemical absorption according to this embodiment. In FIG. 3, the $CO_2$ capture system by chemical absorption according to a comparative example, which is a conventional technology, is shown as a "Basic system", the VR technique is shown as "Vapor recompression (VR)", and the $CO_2$ capture system by chemical absorption according to this embodiment is shown as "Vapor recompression (VR)+Present invention".

With regard to the input and output energy of the basic system in the comparative example, as shown as the left bar graph in FIG. 3, when recovery energy, which is input energy in the reboiler, is assumed to be 100%, approximately 20% of heat in the liquid cooler and approximately 20% of heat in the gas cooler results in waste heat.

In order to reduce recovery energy, in the system that applies a VR technique, a decompression evaporator is installed along the path of the lean solvent system that extends from the regenerator to the liquid heat exchanger in the basic system. Herein, flash evaporation is induced by decompressing the lean solvent, generated vapor is compressed and heated by a compressor and used as vapor for heating the regenerator. The input and output heat in this system is shown as a middle bar graph in FIG. 3 represented as "Vapor recompression (VR)".

Since the VR technique is for converting potential heat of the lean solvent into vapor, waste heat from the liquid cooler is reduced to approximately 5%. Since the heat is returned to the regenerator as vapor for heating, recovery energy in the reboiler can be reduced by approximately 15%.

However, to realize the heating of the rich solvent by the lean solvent through the liquid heat exchanger, temperature of the lean solvent at the inlet of the heat exchanger needs to be higher than the temperature, 100° C. to 120° C., of the rich solvent at the outlet thereof, which limits the reduction of waste heat from the liquid cooler. Furthermore, lowering the pressure of the decompression evaporator will lower the temperature. Therefore, the pressure is restricted so that temperature of the lean solvent supplied from the decompression evaporator to the liquid heat exchanger will not become lower than the temperature at which heat exchange with the rich solvent is possible.

Therefore, pressure of the decompression evaporator cannot be reduced to the normal pressure at which the amount of generated vapor becomes maximum, which also limits the reduction of recovery energy. Furthermore, waste heat from the gas cooler is the same as that in the basic system, and the problem is that altogether approximately 25% of waste heat still remains.

Specifically, temperature of the gas that contains $CO_2$ and vapor discharged from the regenerator is the same as the temperature of the inside of the regenerator. Therefore, the gas cannot be used for heating the regenerator by means of heat exchange. This is a cause that prevents the reduction of waste heat from the gas cooler.

On the contrary, as shown as the right bar graph in FIG. 3 represented as "Vapor recompression (VR)+Present invention", the $CO_2$ capture system by chemical absorption according to this embodiment that simultaneously uses the VR technique can reduce recovery energy inputted into the regenerator by 25% when compared with the basic system in the comparative example and by 10% when compared with the VR technique.

According to this embodiment, it is possible to achieve a $CO_2$ capture system by chemical absorption capable of increasing energy efficiency of the system by reducing recovery energy inputted into the regenerator as well as reducing exhaust heat resulting from liquid cooling and gas cooling.

Embodiment 3

Next, a third embodiment of the $CO_2$ capture system by chemical absorption according to the present invention will be described with reference to FIG. 4.

Figure 4:
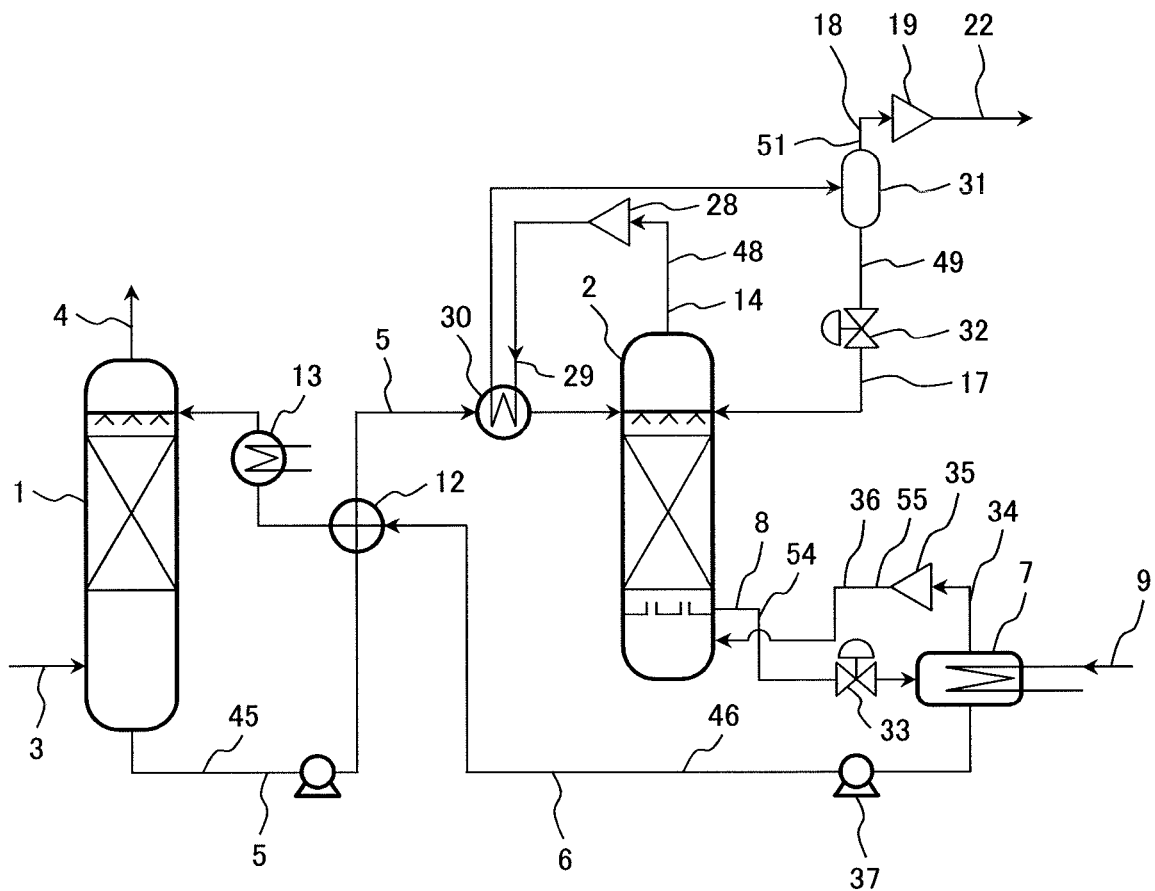
FIG. 4 is a schematic diagram showing the $CO_2$ capture system by chemical absorption according to a third embodiment of the present invention.

Basic configuration of the $CO_2$ capture system by chemical absorption according to this embodiment shown in FIG. 4 is the same as that of the $CO_2$ capture system by chemical absorption according to the first embodiment shown in FIG. 1. Therefore, description of the configuration common to both systems is omitted and only different parts will be described below.

FIG. 4 shows an example of the $CO_2$ capture system by chemical absorption that combines the configuration of the $CO_2$ capture system by chemical absorption according to the first embodiment with the decompression operating method of the reboiler.

In the $CO_2$ capture system by chemical absorption shown in FIG. 4, pressure of the reboiler 7 is decompressed to become lower than the pressure, 0.15 to 0.2 MPa, of the regenerator and operated. The lean solvent 8 from which $CO_2$ has been released in the regenerator 2 is supplied from the regenerator 2 to the reboiler 7 via the decompression valve 33 installed in the solvent supply system 54 and heated by low-pressure regenerated vapor 9 supplied to the reboiler 7.

Because vapor is generated at low pressure in the reboiler 7, the amount of vapor 34 generated from the reboiler 7 increases with the same amount of heat.

Vapor 34 generated by the reboiler 7 is pressurized and heated by the compressor 35 installed in the vapor supply system 55 for supplying vapor from the reboiler 7 to the regenerator 2, and then supplied into the regenerator 2.

After vapor has been generated in the reboiler 7, the lean solvent 6 is supplied to the absorber 1 by means of a pump 37 installed in the lean solvent supply system 46 through the liquid heat exchanger 12 installed in the lean solvent supply system 46.

In the decompression operating method of the reboiler according to this embodiment, it can be said that operations of the reboiler and the VR technique in the $CO_2$ capture system by chemical absorption according to the second embodiment shown in FIG. 2 are simultaneously conducted by the reboiler 7 alone.

Therefore, the same reduction effects of recovery energy and cooling waste heat as those in the $CO_2$ capture system by chemical absorption according to the second embodiment shown in FIG. 2 can be obtained. In addition, in this embodiment, it is possible to make the inner temperature of the reboiler 7 low.

This is because saturation temperature of water is lowered because pressure becomes lower. If temperature conditions of the regenerated vapor 9 which is a heating source for the reboiler 7 are the same, temperature difference from the inner temperature of the reboiler 7 increases, which is advantageous for heat transfer.

Therefore, in this embodiment, it is possible to reduce the heat-transfer area of the regenerated vapor tube in the reboiler 7 thereby reducing the size of the reboiler 7 and production costs.

According to this embodiment, it is possible to achieve a $CO_2$ capture system by chemical absorption capable of increasing energy efficiency of the system by reducing recovery energy inputted into the regenerator as well as reducing exhaust heat resulting from liquid cooling and gas cooling.

Embodiment 4

Next, a fourth embodiment of the $CO_2$ capture system by chemical absorption according to the present invention will be described with reference to FIG. 5.

Figure 5:
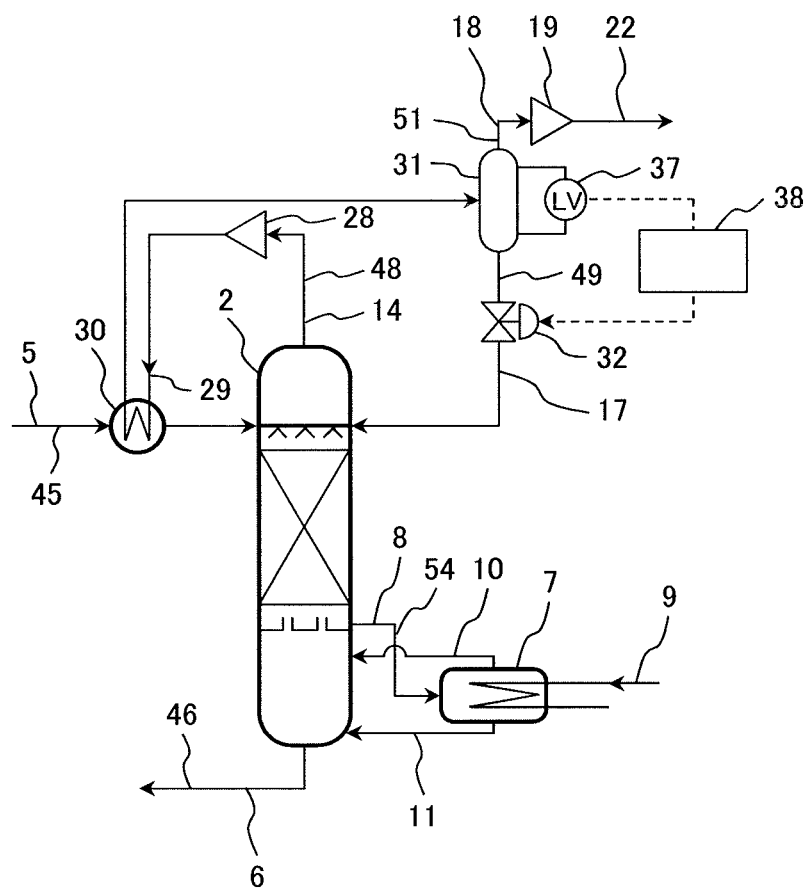
FIG. 5 is a schematic diagram showing the $CO_2$ capture system by chemical absorption according to a fourth embodiment of the present invention.

Basic configuration of the $CO_2$ capture system by chemical absorption according to this embodiment shown in FIG. 5 is the same as that of the $CO_2$ capture system by chemical absorption according to the first embodiment shown in FIG. 1. Therefore, description of the configuration common to both systems is omitted and only different parts will be described below.

FIG. 5 shows an example of the method of controlling the $CO_2$ capture system by chemical absorption according to this embodiment.

The arrangement of the apparatuses and systems in the $CO_2$ capture system by chemical absorption according to this embodiment is the same as that of those in the $CO_2$ capture system by chemical absorption according to the first embodiment. Herein, pressure of the gas-liquid separator 31 is almost equal to the outlet pressure of the compressor 28 and higher than the inner pressure of the regenerator 2. Therefore, condensed water in the gas-liquid separator 31 flows into the regenerator 2 due to pressure difference. However, if all of the condensed water flows out, a gas channel opens between the high-pressure gas in the gas-liquid separator 31 and the gas in the regenerator 2, and $CO_2$ rich gas 18 results in flowing into the regenerator 2.

To prevent the above, in this embodiment, there are provided a level gauge 37 for measuring a liquid level of condensed water in the gas-liquid separator 31, and a controller 38 for determining the degree of opening of the flow control valve 32 according to the measurement signal of the level gauge 37 and using the value 32 for the operation.

By the control performed by the controller 38, it is possible to always store a certain level of condensed water in the gas-liquid separator 31 and seal the gas in the gas-liquid separator 31 and the gas in the regenerator 2.

The controller 38 may perform control by using a function for determining the degree of opening of the flow control valve 32 according to the level of condensed water measured by the level gauge 37. Furthermore, control may be performed by using a circuit by which the flow control valve 32 opens when the measured liquid level by the level gauge 37 exceeds the preset liquid level, and the flow control valve 32 closes when the measured liquid level by the level gauge 37 is lower than the preset liquid level. Alternatively, hysteresis control may be applied by which the flow control valve 32 opens when the measured liquid level by the level gauge 37 exceeds the preset high liquid level, and the flow control valve 32 closes when the measured liquid level by the level gauge 37 is lower than the preset low liquid level.

According to this embodiment, it is possible to achieve a $CO_2$ capture system by chemical absorption capable of increasing energy efficiency of the system by reducing recovery energy inputted into the regenerator as well as reducing exhaust heat resulting from liquid cooling and gas cooling.

The present invention can be applied to the $CO_2$ capture system by chemical absorption.

The invention claimed is:

1. A $CO_2$ capture system by chemical absorption for removing $CO_2$ from a combustion exhaust gas by a solvent, comprising:
    an absorber for absorbing $CO_2$ by the solvent;
    a regenerator for heating a rich solvent that has absorbed $CO_2$ thereby releasing $CO_2$ and forming a lean solvent;
    a rich solvent supply system for supplying the rich solvent from the absorber to the regenerator;
    a lean solvent supply system for supplying the lean solvent from the regenerator to the absorber;
    a heat exchanger for exchanging heat between the rich solvent and the lean solvent supplied from the respective supply systems; and
    a reboiler for heating the solvent supplied from the regenerator;
    the $CO_2$ capture system by chemical absorption further comprising:
    a gas exhaust system for discharging gas released from the solvent in the regenerator;
    a gas compressor installed downstream of the gas exhaust system;
    a heat exchanger disposed downstream of the gas compressor for exchanging heat between a compressed gas and a rich solvent to be supplied to the regenerator;
    a gas-liquid separator disposed downstream of the heat exchanger for separating gas from condensed water;
    a condensed water supply system for supplying condensed water from the gas-liquid separator to the regenerator;
    another gas exhaust system for discharging gas containing high-concentration $CO_2$ from the gas-liquid separator;
    a compressor, disposed downstream of the gas-liquid separator in the another gas exhaust system, for pressurizing the gas containing high-concentration $CO_2$, and
    a vapor recompression system for supplying vapor to the regenerator comprising:
    a decompression evaporator for evaporating the lean solvent discharged from the regenerator or the reboiler;

a compressor for pressurizing vapor generated by the decompression evaporator; and a vapor system for supplying the vapor generated by the decompression evaporator to the compressor and supplying the vapor pressurized and heated by the compressor to the regenerator.

2. The $CO_2$ capture system by chemical absorption according to claim 1, the $CO_2$ capture system by chemical absorption further comprising:

a condensed water supply system for supplying condensed water separated by the gas-liquid separator from the gas-liquid separator to the regenerator;

a control valve disposed in the condensed water system;

another gas exhaust system for discharging gas containing high-concentration $CO_2$ separated by the gas-liquid separator;

a level gauge for measuring a level of condensed water in the gas-liquid separator; and a controller for opening and closing the valve provided in the condensed water system according to the level of the condensed water in the gas-liquid separator measured by the level gauge.

* * * * *